United States Patent
Eren et al.

(10) Patent No.: US 8,416,061 B2
(45) Date of Patent: *Apr. 9, 2013

(54) CONTROLLING RADIO FREQUENCY IDENTIFICATION TAG SIGNAL RANGE

(75) Inventors: Selcuk S. Eren, Chapel Hill, NC (US); Brian J. Jaeger, Wake Forest, NC (US); Douglas A. Law, Chapel Hill, NC (US); Thomas S. Mazzeo, Durham, NC (US); Paul A. Roberts, Raleigh, NC (US); Shawn K. Sremaniak, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,373

(22) Filed: Feb. 15, 2012

(65) Prior Publication Data

US 2012/0146772 A1 Jun. 14, 2012

Related U.S. Application Data

(63) Continuation of application No. 11/613,660, filed on Dec. 20, 2006, now Pat. No. 8,193,911.

(51) Int. Cl.
*G08B 21/00* (2006.01)
(52) U.S. Cl. .................. 340/10.1; 340/572.1; 340/572.5; 340/572.7; 343/742; 343/743; 343/745
(58) Field of Classification Search .................... 340/10; 343/742, 743, 745, 739
See application file for complete search history.

(56) References Cited

U.S. PATENT DOCUMENTS

| | | | |
|---|---|---|---|
| 3,934,206 | A | 1/1976 | Holecek |
| 4,947,456 | A | 8/1990 | Atkinson et al. |
| 5,926,110 | A | 7/1999 | Downs et al. |
| 6,307,517 | B1 | 10/2001 | Lee |
| 6,377,176 | B1 | 4/2002 | Lee |
| 6,556,813 | B2 | 4/2003 | Tsui |
| 6,661,405 | B1 | 12/2003 | Flowers |
| 6,696,893 | B2 | 2/2004 | Burns et al. |
| 6,720,757 | B2 | 4/2004 | Khorram et al. |
| 6,840,444 | B2 | 1/2005 | Pierce et al. |
| 6,869,021 | B2 | 3/2005 | Foth et al. |

(Continued)

FOREIGN PATENT DOCUMENTS

| | | |
|---|---|---|
| CN | 1560788 A | 1/2005 |
| CN | 1816818 A | 8/2006 |

OTHER PUBLICATIONS

Office Action, dated Jan. 25, 2010, regarding U.S. Appl. No. 11/613,660, 17 pages.
Response to Office Action, dated Mar. 26, 2010, regarding U.S. Appl. No. 11/613,660, 16 pages.

(Continued)

*Primary Examiner* — Jennifer Mehmood
*Assistant Examiner* — Mark Rushing
(74) *Attorney, Agent, or Firm* — Yee & Associates, P.C.; Steven L. Bennett (57) ABSTRACT

A method, apparatus, and computer usable program product for controlling a range of a radio frequency identification tag signal. The process identifies an operative range for the radio frequency identification tag signal of a radio identification tag. The process then selects a set of conductive paths in the radio frequency identification tag corresponding to the desired operative range. The set of conductive paths controls the range of the radio frequency identification tag signal in the radio identification frequency tag.

16 Claims, 10 Drawing Sheets

U.S. PATENT DOCUMENTS

| | | |
|---|---|---|
| 6,882,338 B2 | 4/2005 | Flowers |
| 6,937,179 B1 | 8/2005 | Martin |
| 6,937,180 B1 | 8/2005 | Muratov et al. |
| 6,999,028 B2 | 2/2006 | Egbert |
| 7,042,336 B2 | 5/2006 | Pierce et al. |
| 7,248,165 B2 | 7/2007 | Collins et al. |
| 7,283,037 B2 | 10/2007 | Diorio et al. |
| 7,304,577 B2 | 12/2007 | Waldner et al. |
| 7,339,481 B2 | 3/2008 | Duron |
| 7,477,151 B2 | 1/2009 | Forster et al. |
| 7,516,057 B2 | 4/2009 | Bridgelall |
| 7,868,681 B2 | 1/2011 | van der Wagt |
| 8,130,082 B2 | 3/2012 | Kang |
| 2001/0034213 A1 | 10/2001 | Tsui |
| 2003/0184277 A1 | 10/2003 | Khorram et al. |
| 2004/0032369 A1 | 2/2004 | Flowers |
| 2004/0074963 A1 | 4/2004 | Pierce et al. |
| 2004/0075534 A1 | 4/2004 | Pierce et al. |
| 2005/0012616 A1 | 1/2005 | Forster et al. |
| 2005/0052283 A1 | 3/2005 | Collins et al. |
| 2005/0099270 A1 | 5/2005 | Diorio et al. |
| 2005/0134506 A1 | 6/2005 | Egbert |
| 2005/0231331 A1 | 10/2005 | Kang |
| 2006/0054710 A1* | 3/2006 | Forster et al. .................. 235/492 |
| 2007/0057797 A1 | 3/2007 | Waldner et al. |
| 2008/0150747 A1 | 6/2008 | Eren et al. |
| 2009/0108931 A1 | 4/2009 | Wagt |

OTHER PUBLICATIONS

Final Office Action, dated Jul. 12, 2010, regarding U.S. Appl. No. 11/613,660, 15 pages.
Appeal Brief, dated Dec. 10, 2010, regarding U.S. Appl. No. 11/613,660, 33 pages.
Office Action, dated Mar. 21, 2011, regarding U.S. Appl. No. 11/613,660, 15 pages.
Response to Office Action, dated Jun. 21, 2011, regarding U.S. Appl. No. 11/613,660, 22 pages.
Office Action, dated Sep. 21, 2011, regarding U.S. Appl. No. 11/613,660, 10 pages.
Response to Office Action, dated Dec. 15, 2011, regarding U.S. Appl. No. 11/613,660, 11 pages.
Notice of Allowance, dated Feb. 1, 2012, regarding U.S. Appl. No. 11/613,660, 8 pages.

* cited by examiner

CONTROLLING RADIO FREQUENCY IDENTIFICATION TAG SIGNAL RANGE

This application is a continuation of U.S. patent application Ser. No. 11/613,660, filed Dec. 20, 2006, granted as U.S. Pat. No. 8,193,911, issued on Jun. 5, 2012.

BACKGROUND OF THE INVENTION

1. Field of the Invention

The present invention relates generally to an improved apparatus, and in particular, the present invention relates to radio frequency identification tags. Still more particularly, the present invention is related to a method, apparatus, and a computer usable program product for controlling a range of a radio frequency identification tag signal.

2. Description of the Related Art

Radio frequency identification (RFID) is a term that refers to technology utilizing radio waves for transmitting data. Radio frequency identification systems can be used in numerous applications including electronically collecting toll fees on a toll road, paying for gas at a gas pump, and tracking and/or identifying people or things. For example, radio frequency identification tags can be used to identify animals, containers, household consumer goods, and construction equipment. A common method for using radio frequency identification technology consists of storing a serial number and/or other identifying information, such as an address or the name of a manufacturer, in a microchip. The microchip is coupled to an antenna for transmitting the identifying information via radio waves to a reader that can convert the radio wave signal into digital information for subsequent processing. The microchip and antenna assembly, which is called a radio frequency identification tag, is carried by or affixed to a person, animal, container, or thing.

The distance at which a radio frequency identification tag reader can detect and read the signal of a radio frequency identification tag is the operative range of the radio frequency identification tag. This operative range is a crucial factor in determining the potential applications for which a radio frequency identification tag can be used. For example, a radio frequency identification tag having an operative range of a few inches or less may be preferred in a radio frequency identification system for purchasing gasoline at a gas pump. However, that same radio frequency identification tag would be impractical for use in a system for the electronic collection of toll fees because of the inherent risks of requiring a speeding vehicle to pass in close proximity to a radio frequency identification tag reader.

Controlling the operative range of a radio frequency identification tag may be necessary to quell privacy concerns as well. For example, radio frequency identification tags affixed on freight containers may have an operative range of twenty feet or more to facilitate the identification and tracking of containers without the need to physically approach each and every container. However, affixing radio frequency identification tags with similar operative ranges to household items purchased by consumers may permit a user of a portable radio frequency identification scanner to identify all the tagged items in a personal residence.

For reasons such as these, radio frequency identification tags are required to have different operative ranges depending upon the various applications to which they are applied. However, producing radio frequency identification tags with different operative ranges increases the purchase price of the radio frequency identification tag due to the current difficulties in manufacturing and stocking the tags with varying signal ranges. Consequently, radio frequency identification tags are not economically feasible for use in all applications, such as those tracking and identification systems for less expensive items.

BRIEF SUMMARY OF THE INVENTION

The illustrative embodiments described herein provide a method, an apparatus, and a computer usable program product for controlling a range of a radio frequency identification tag signal. The process identifies an operative range for the radio frequency identification tag signal of a radio identification tag. The process then selects a set of conductive paths in the radio frequency identification tag corresponding to the desired operative range. The set of conductive paths controls the range of the radio frequency identification tag signal in the radio identification frequency tag.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
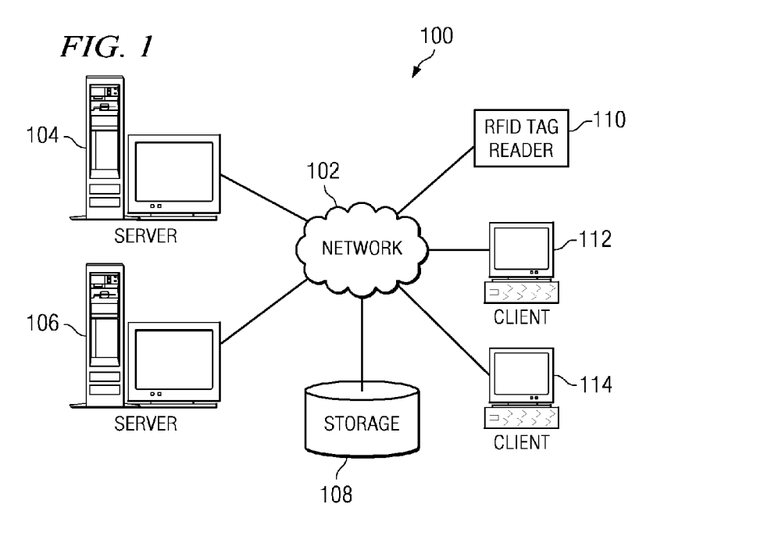
FIG. 1 is a pictorial representation of a network data processing system in which illustrative embodiments may be implemented.
Figure 2:
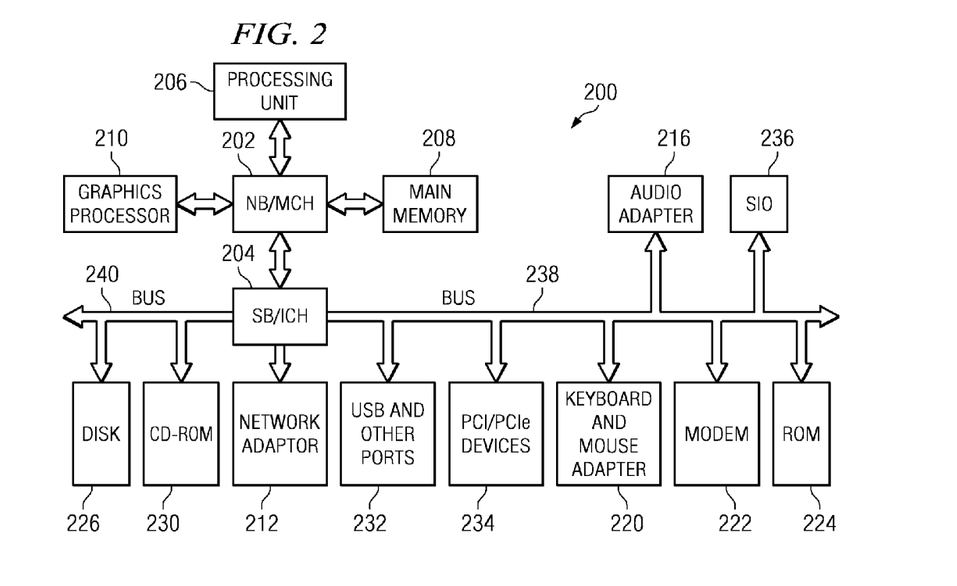
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, radio frequency identification tag reader 110 and clients 112 and 114 are coupled to network 102. Radio frequency identification tag reader 110 and clients 110 and 112 are examples of devices utilized for transmitting data related radio frequency identification tag applications, such as serial numbers and product codes that are exchangeable in network data processing system 100. For example, a serial number stored in an un-depicted radio frequency identification tag is received by radio frequency identification tag reader 110 and subsequently transmitted to client 110 or server 106 via network 102.

Radio frequency identification tag (RFID) reader 110 is a device operable to transmit and receive electromagnetic radio waves for purposes of communicating with a radio frequency identification tag. Radio frequency identification tag reader 110 may be a standalone device, or a component of a computing device, such as clients 112 and 114. Radio frequency identification tag reader 110 is any type of known or available radio frequency identification tag reader for receiving or reading radio frequency identification signals from a radio frequency identification tag.

Clients 112 and 114 may be, for example, a personal computer, laptop, tablet PC, or network computer. In the depicted example, server 104 provides data, such as boot files, operating system images, and applications to radio frequency identification tag reader 110 and clients 112 and 114. Radio frequency identification tag reader 110 and clients 112 and 114 are coupled to server 104 in this example. Network data processing system 100 may include additional servers, clients, radio frequency identification tag readers, and other computing devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computing device, such as server 104 and clients 112 and 114 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). The operating system may also be a retail specific operating system, such as IBM® 4690 Operating System®. An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a method, an apparatus, and a computer usable program product for controlling a range of a radio frequency identification tag signal. The process identifies an operative range for the radio frequency identification tag signal of a radio identification tag. The process then selects a set of conductive paths in the radio frequency identification tag corresponding to the desired operative range. The set of conductive paths controls the range of the radio frequency identification tag signal in the radio identification frequency tag.

A conductive path is a path through which an electrical current can pass. This path can be, for example, a metal wire or a pattern printed in conductive ink. In an illustrative embodiment, a conductive path may further comprise a terminal and, optionally, a resistor. In another illustrative embodiment, a conductive path may further comprise a resistor and an electrical bypass. An electrical bypass is comprised of a conductive material, such as a metal wire or conductive ink pattern, which redirects an electrical current around a circuit element, such as a resistor, rather than allowing the current to flow through the circuit element. The electrical bypass can be disrupted by a user to select a set of conductive paths in a radio frequency identification tag to control the range of a radio frequency identification signal. A set of conductive paths can be one or more conductive paths.

In an illustrative embodiment, a radio frequency identification tag comprises an antenna coupled to a resistive voltage divider network. A resistive voltage divider network is an electrical circuit comprising a radio frequency identification chip and a first resistor that can be coupled to a second resistor in a series configuration. The second resistor is selected from a set of two or more resistors that are each located within an individual conductive path. The second resistor is selected by selecting one or more of a set of conductive paths of a radio frequency identification tag through which an electrical current passes.

In an illustrative embodiment, the second resistor is selected by selecting a conductive path within a resistive voltage divider network by marking a radio frequency identification tag with graphite or conductive ink. In another illustrative embodiment, the second resistor is selected by disrupting the conductive path within a resistive voltage divider network. In yet another embodiment, the second resistor is selected by utilizing a radio frequency identification tag reader to direct a switching device in a radio frequency identification tag to select a conductive path within a resistive voltage divider network. The selection of the second resistor specifies the range of the radio frequency identification signal. The range of the radio frequency identification signal correlates to the operative range of the radio frequency identification tag.

The range of a radio frequency identification tag signal is a function of the voltage at the point between the two resistors where the radio frequency identification chip is located. This voltage can be described by the following equation:

$$V_{in} = V_{ant} * (R_n / (R_n + R_1))$$

where
- $V_{in}$ is the radio frequency signal input to the radio frequency identification tag chip, which can be controlled by the resistive voltage divider network;
- $V_{ant}$ is the voltage generated by the radio frequency identification antenna when a radio frequency identification tag reader signal is captured;
- $R_1$ is the resistance of a first resistor; and
- $R_n$ is the resistance of a second resistor selectable to control signal strength, where "n" represents a resistor selected from a set of two or more resistors.

Using the relationship identified in the above equation, a radio frequency identification tag can be designed with an antenna coupled to a resistive voltage divider network for controlling a range of a radio frequency identification tag signal. By incorporating into the resistive voltage divider network a first resistor $R_1$ with a known resistance, and providing a set of two or more resistors, $R_n$, with different resistances, the range of a radio frequency identification tag signal can be controlled by selecting a second resistor to provide a value of $V_{in}$ that corresponds to the desired operative range of the radio frequency identification tag.

Figure 3:
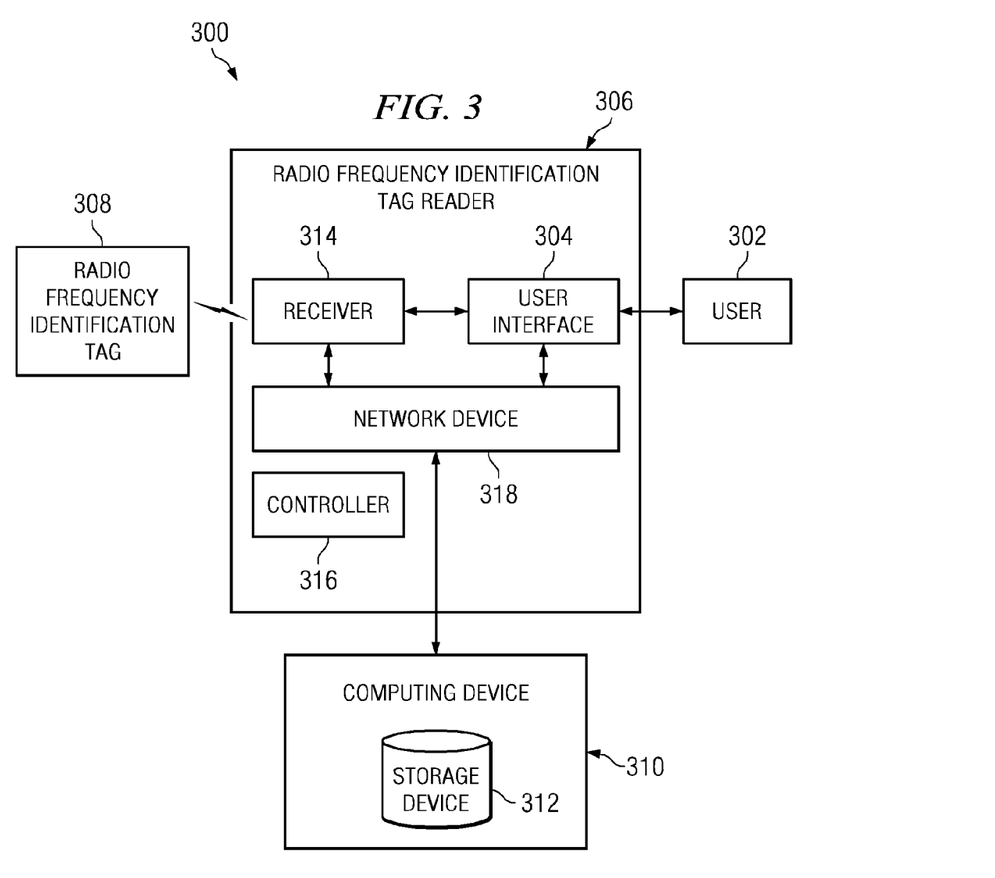
FIG. 3 is a block diagram illustrating the data flow through components of a system for controlling a range of a radio frequency identification tag signal in accordance with an illustrative embodiment.

Turning now to FIG. 3, a diagram of the interaction of a radio frequency identification tag in a network data processing system is depicted in accordance with an illustrative embodiment. Network data processing system 300 is a network data processing system such as network data processing system 100 of FIG. 1.

User 302 interacts with user interface 304 to operate radio frequency identification tag reader 306. Radio frequency identification tag reader 306 is a device for communicating with a radio frequency identification tag, such as radio frequency identification tag 308. Although radio frequency identification tag reader 306 is depicted as a standalone device, in another embodiment, radio frequency identification tag reader 306 may be a component of a computing device, such as computing device 310.

Computing device 310 is any computing device capable of receiving and processing data received from radio frequency identification tag reader 306. Computing device 310 may be, for example, a personal computer, laptop, tablet PC, or network computer or server. Computing device 310 may also include storage device 312 for storing the data from radio frequency identification tag 308, and for storing computer programs used for processing the data, such as a database.

User interface 304 is any known or available type of user interface, including but not limited to, a touch screen, a graphical user interface (GUI), a command line interface, a menu driven interface, a keyboard, a mouse, an alphanumeric keypad, or a voice recognition system. Although user interface 304 is depicted as a component in radio frequency identification tag reader 306, in another embodiment user interface 304 may be a separate component from radio frequency identification tag reader 306. For example, user interface 304 can be a component of computing device 310 or coupled to computing device 310.

Radio frequency identification tag reader 306 communicates with radio frequency identification tag 308 via receiver 314. In an illustrative embodiment where radio frequency identification tag 308 is a passive radio frequency identification tag, receiver 314 receives a signal from radio frequency identification tag 308 in response to receiver 314 sending a first signal to radio frequency identification tag 308 for purposes of powering the circuitry of radio frequency identification tag 308.

Controller 316 is a software component implemented by radio frequency identification tag reader 306 for converting the signal received from radio frequency identification tag 308 into data for subsequent processing. In an illustrative embodiment, controller 316 is capable of processing the data received from radio frequency identification tag 308. In another illustrative embodiment, the data is transferred to another computing device, such as computing device 310, for processing. Processing the data received from radio frequency identification tag 308 may comprise, for example, inputting the data into a database.

Radio frequency identification tag reader 306 may also contain network adapters or other devices to enable radio frequency identification tag reader 306 to interact with other computing devices, data processing systems, remote printers, or storage devices through intervening private or public networks. For example, network device 318 is coupled to computing device 310. Modems, cable modems, wireless network cards, and Ethernet cards are just a few of the currently available types of network adapters.

Figure 4:
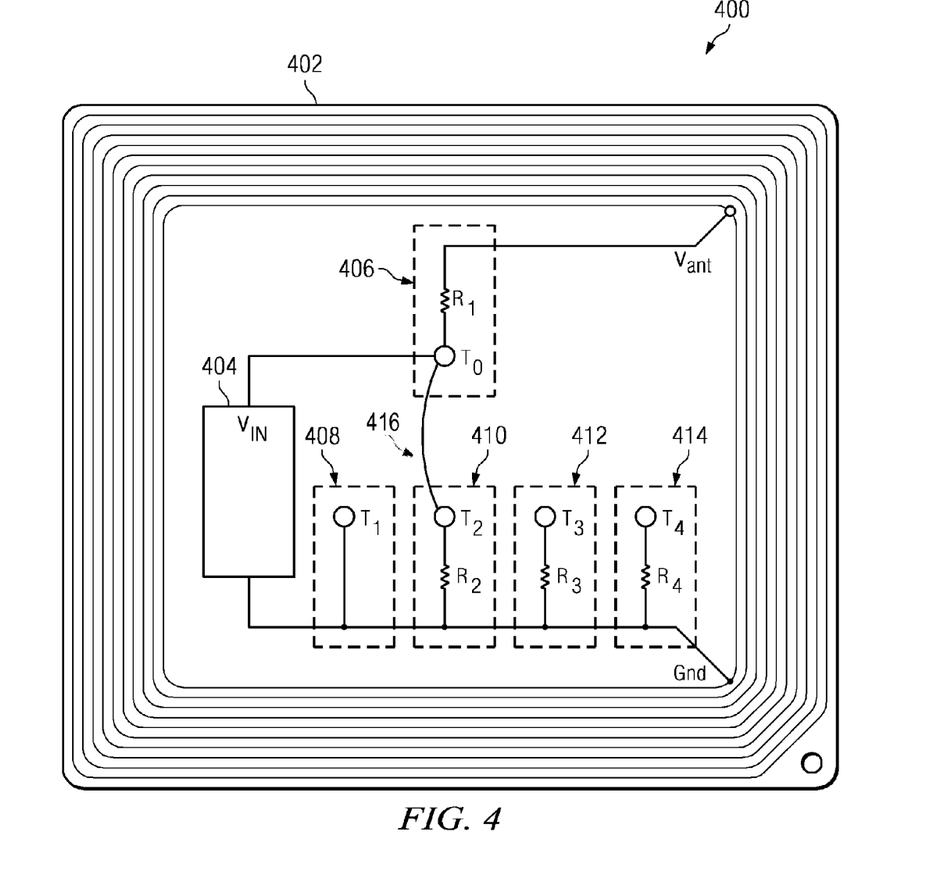
FIG. 4 is a pictorial representation of a radio frequency identification tag having connective terminals in accordance with an illustrative embodiment.

Referring now to FIG. 4, a diagram of a radio frequency identification tag is shown in accordance with an illustrative embodiment. Radio frequency identification tag 400 comprises antenna 402 coupled to a resistive voltage divider network. The resistive voltage divider network comprises radio frequency identification chip 404, primary conductive path 406 and secondary conductive paths 408, 410, 412, and 414.

Primary conductive path 406 comprises resistor $R_1$ and terminal $T_0$. Secondary conductive paths 408, 410, 412, and 414 each comprise a terminal and, optionally, a resistor. A user can couple primary conductive path 406 to one of the secondary conductive paths 408, 410, 412, and 414 to control the signal range of radio frequency identification tag 400.

In this illustrative embodiment, after a user selects a radio frequency identification tag, the user identifies a desired operative range for the radio frequency identification tag signal. Identifying an operative range consists of identifying a maximum distance between the radio frequency identification tag reader and a radio frequency identification tag in which the radio frequency identification tag reader is still capable of detecting or reading a signal from a radio frequency identification tag. The user then couples primary conductive path 406 to one of the secondary conductive paths, such as conductive path 410 by connecting terminal $T_0$ to terminal $T_2$ via connection 416. Connection 416 can be graphite, conductive ink, or any other marking capable of conducting an electrical current. By connecting terminal $T_0$ of primary conductive path 406 to the terminal $T_2$ of conductive path 410, a user has completed the circuit of the resistive voltage divider network, thereby activating radio frequency identification tag 400 to operate with a signal strength corresponding to the value of $V_{in}$ as a function of $V_{ant}$, $R_1$, and $R_2$ as described above.

After an initial activation, the range of radio frequency identification tag 400 can be subsequently altered provided that connection 416 is erasable, as in the instance where connection 416 is a graphite marking. In these examples, a graphite marking can be erased with an eraser commonly used to remove graphite markings, such as the erasers affixed to the end of a pencil. In this manner, a new connection between terminal $T_0$ of primary conductive path 406 and $T_3$ of secondary conductive path 412, for example, can be marked thereby changing the operative range of radio frequency identification tag 400. Furthermore, radio frequency identification tag 400 can be deactivated by inserting connection 416 between terminals $T_0$ and $T_1$ to short circuit the resistive voltage divider network of radio frequency identification tag 400.

Figure 5:
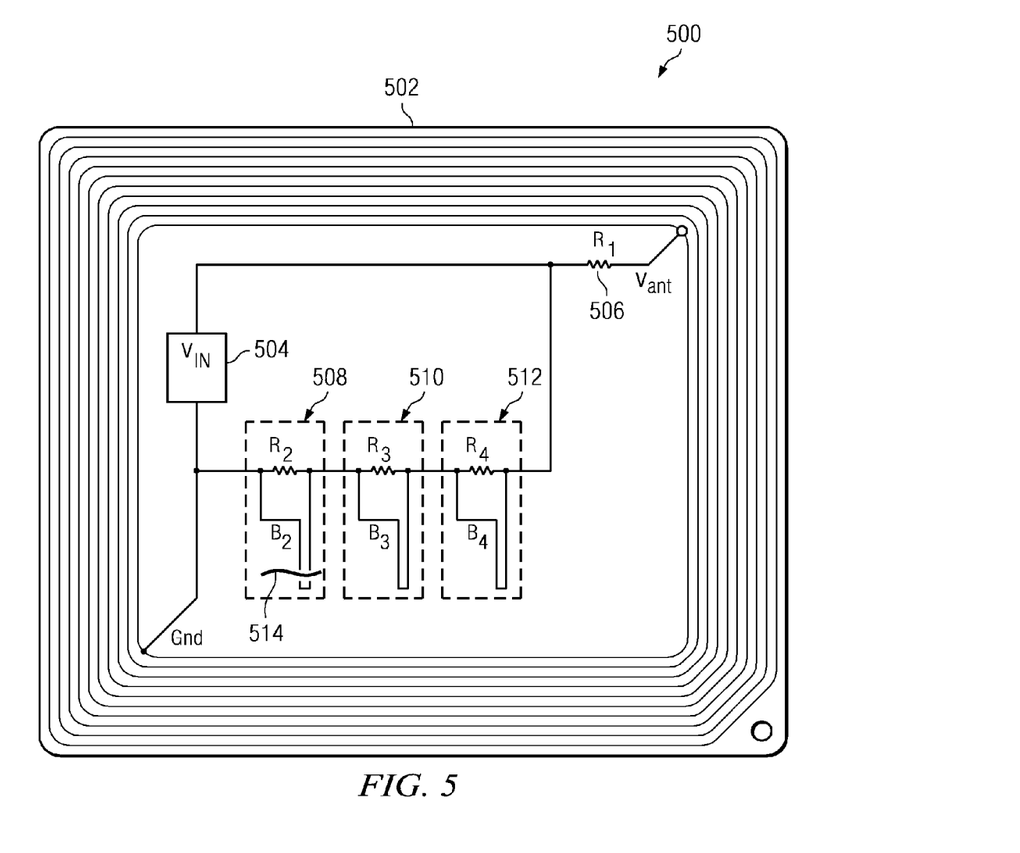
FIG. 5 is a pictorial representation of a radio frequency identification tag in accordance with an illustrative embodiment.

Referring now to FIG. 5, a diagram of a radio frequency identification tag is shown in accordance with an illustrative embodiment. Radio frequency identification tag 500 comprises antenna 502 coupled to a resistive voltage divider network. The resistive voltage divider network comprises radio frequency identification chip 504, resistor $R_1$ 506, and conductive paths 508, 510, and 512. Conductive paths 508, 510, and 512 each comprises at least one resistor and an electrical bypass. By disrupting an electrical bypass from a set of electrical bypasses, a user can direct a current through the resistor of the conductive path having the disrupted electrical bypass. In this manner, a user can control the operative range of radio frequency identification tag 500.

In this illustrative embodiment, disruptive marking 514 is a scratch on the electrical bypass of conductive path 508 that disrupts the electrical bypass of conductive path 508. A user inserts disruptive marking 514 into an electrical bypass after having selected a radio frequency identification tag and a deciding upon an operative range for the radio frequency identification tag signal. Disruptive marking 514 can be inserted by scratching the conductive path with a fingernail, pen, knife, or any other instrument capable of disrupting the conductive path. Consequently, radio frequency identification tag 500 is active and generating a signal with a range corresponding to a value of $V_{in}$ that is a function of $V_{ant}$, $R_1$, and $R_2$.

Figure 6:
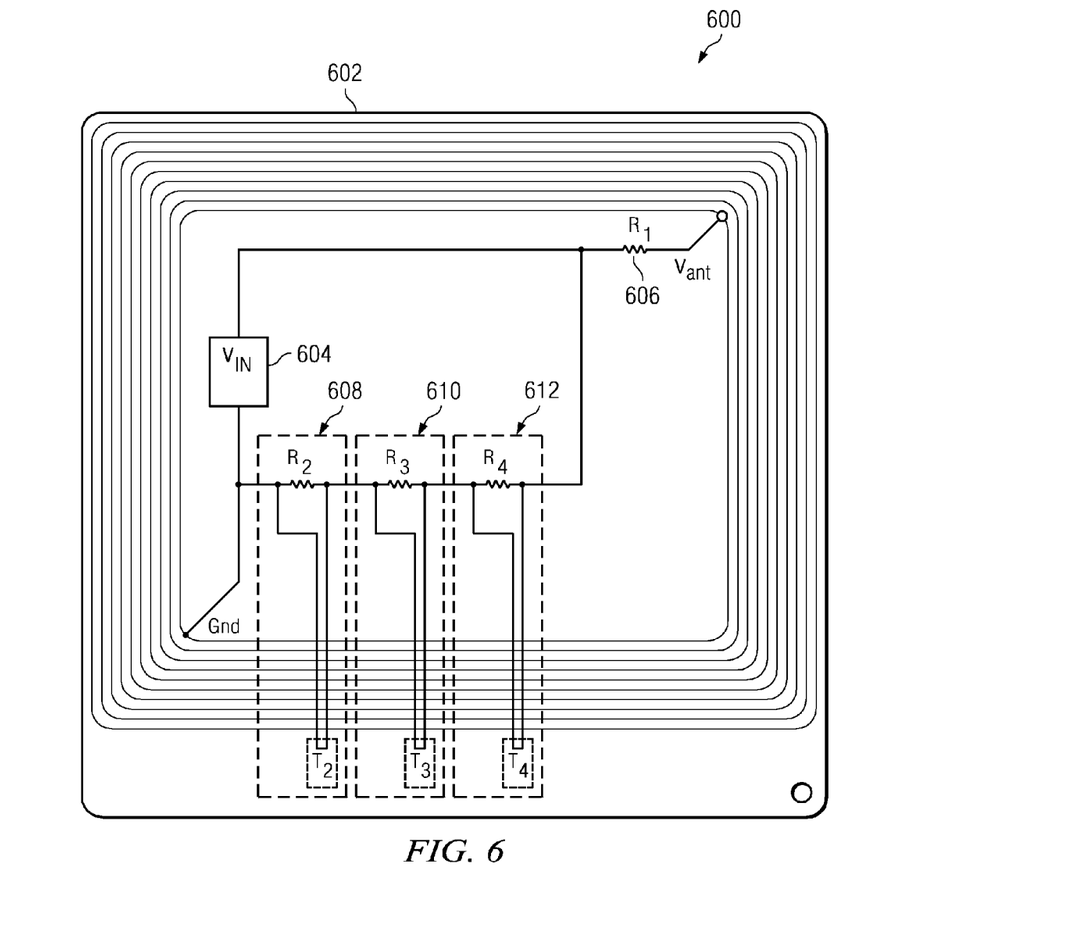
FIG. 6 is a pictorial representation of a radio frequency identification tag having removable tabs in accordance with an illustrative embodiment.

Referring now to FIG. 6, a diagram of a radio frequency identification tag is shown in accordance with an illustrative embodiment. Radio frequency identification tag 600 comprises an antenna 602 coupled to a resistive voltage divider network. The resistive voltage divider network comprises radio frequency identification tag chip 604, resistor $R_1$ 606, and conductive paths 608, 610, and 612. Conductive paths 608, 610, and 612 each comprise at least one resistor and a removable tab traversed by a portion of an electrical bypass. For example, conductive path 610 comprises resistor $R_3$ and removable tab $T_3$.

By disrupting an electrical bypass, a user can direct a current through the resistor of the conductive path having the disrupted electrical bypass. For example, in this illustrative embodiment, an electrical bypass is disrupted by removing a tab, such as tab $T_2$ of conductive path 608. Consequently, radio frequency identification tag 600 is activated and generating a signal with a range corresponding to a value of $V_{in}$ that is a function of $V_{ant}$, $R_1$, and $R_2$.

Figure 7:
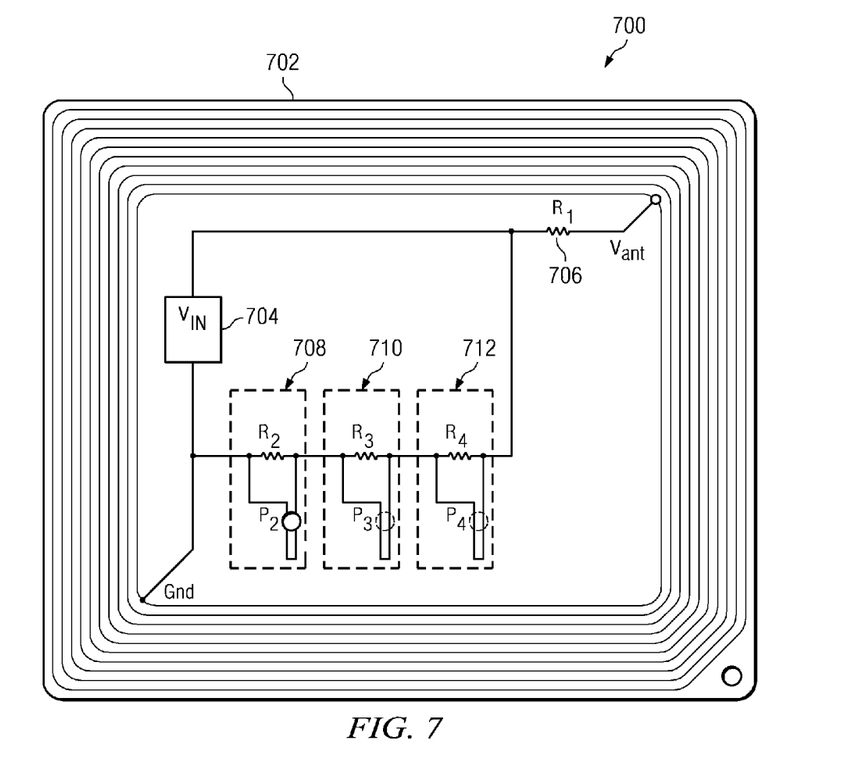
FIG. 7 is a pictorial representation of a radio frequency identification tag having removable perforated segments in accordance with an illustrative embodiment.

Referring now to FIG. 7, a diagram of a radio frequency identification tag is shown in accordance with an illustrative embodiment. Radio frequency identification tag 700 comprises an antenna 702 coupled to a resistive voltage divider network. The resistive voltage divider network comprises radio frequency identification chip 704, resistor $R_1$ 706, and conductive paths 708, 710, and 712. Conductive paths 708, 710, and 712 each comprise at least one resistor and a removable, perforated segment traversed by a portion of an electrical bypass. For example, conductive path 710 comprises resistor $R_3$ and perforated segment $P_3$.

By disrupting the electrical bypass, a user can direct a current through the resistor of the conductive path having the disrupted electrical bypass. In this illustrative embodiment, an electrical bypass is disrupted by displacing a perforated segment, such as perforated segment $P_2$ of conductive path 708. Consequently, radio frequency identification tag 700 is active and generating a signal with a range corresponding to a value of $V_{in}$ that is a function of $V_{ant}$, $R_1$, and $R_2$.

Figure 8:
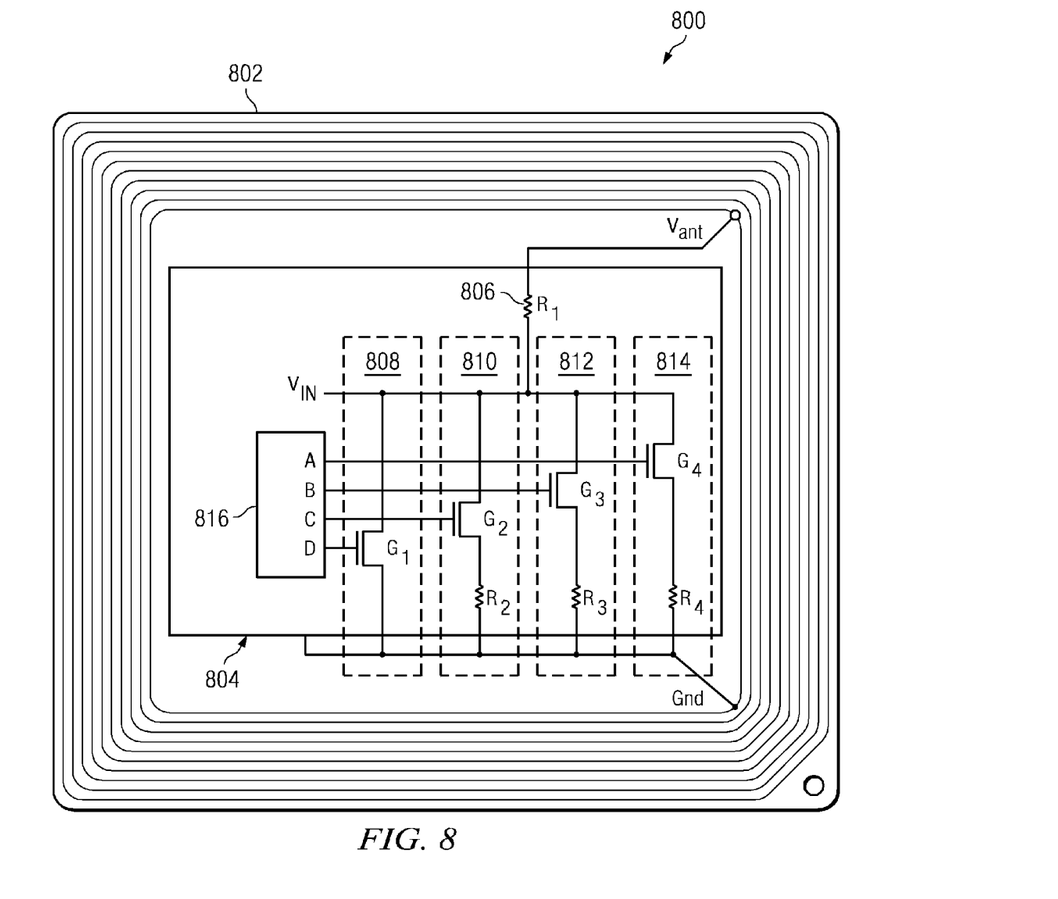
FIG. 8 is a pictorial representation of a radio frequency identification tag having a switching device in accordance with an illustrative embodiment.

Referring now to FIG. 8, a diagram of a radio frequency identification tag is shown in accordance with an illustrative embodiment. Radio frequency identification tag 800 comprises antenna 802 that is coupled to radio frequency identification tag chip 804. A resistive voltage divider network comprising resistor $R_1$ 806 is coupled to conductive paths 808, 810, 812, and 814. Each conductive path comprises a gate that is coupled to switching device 816, and, optionally, a resistor. Although in this illustrative embodiment, the resistive divider network is depicted within radio frequency identification tag chip 804, in another embodiment, the resistive voltage divider network is externally coupled to radio frequency identification tag chip 804.

Antenna 802 receives an input signal from a radio frequency identification tag reader, such as radio frequency identification tag reader 306 in FIG. 3. The input signal comprises data for directing switching device 816 to close a gate of a conductive path corresponding to a desired range of a radio frequency identification tag signal. Closing the gate of the conductive path completes a circuit of the resistive voltage divider network thereby activating the radio frequency identification tag to function at a given operative range.

At any given time, the operative range of radio frequency identification tag 800 can be reset by a user operating a radio frequency identification tag reader, such as radio frequency identification tag reader 306 in FIG. 3, to function with a different operative range. In particular, a new gate selection is programmed into the radio frequency identification tag reader that sends a new input signal directing switching device 816 to open the previously closed gate and close a new gate corresponding to the new operative range. Further, if the operator of a radio frequency identification tag reader decides to deactivate radio frequency identification tag 800, then antenna 802 receives an input from a radio frequency identification tag reader that directs switching device 816 to close gate $G_1$ of conductive path 808. Closing gate $G_1$ short circuits the resistive voltage divider network thereby deactivating radio frequency identification tag reader 800.

Although radio frequency identification tag 400 in FIG. 4, radio frequency identification tag 500 in FIG. 5, radio frequency identification tag 600 in FIG. 6, radio frequency identification tag 700 in FIG. 7, and radio frequency identification tag 800 in FIG. 8 are depicted as passive radio frequency identification tags, in other embodiments, each of the above-referenced radio frequency identification tags can be active radio frequency identification tags or semi-passive radio frequency identification tags. Both active radio frequency identification tags and semi-passive radio frequency identification tags are coupled to a battery. In any event, the method for controlling the range of a radio frequency identification tag's signal is unchanged.

Figure 9:
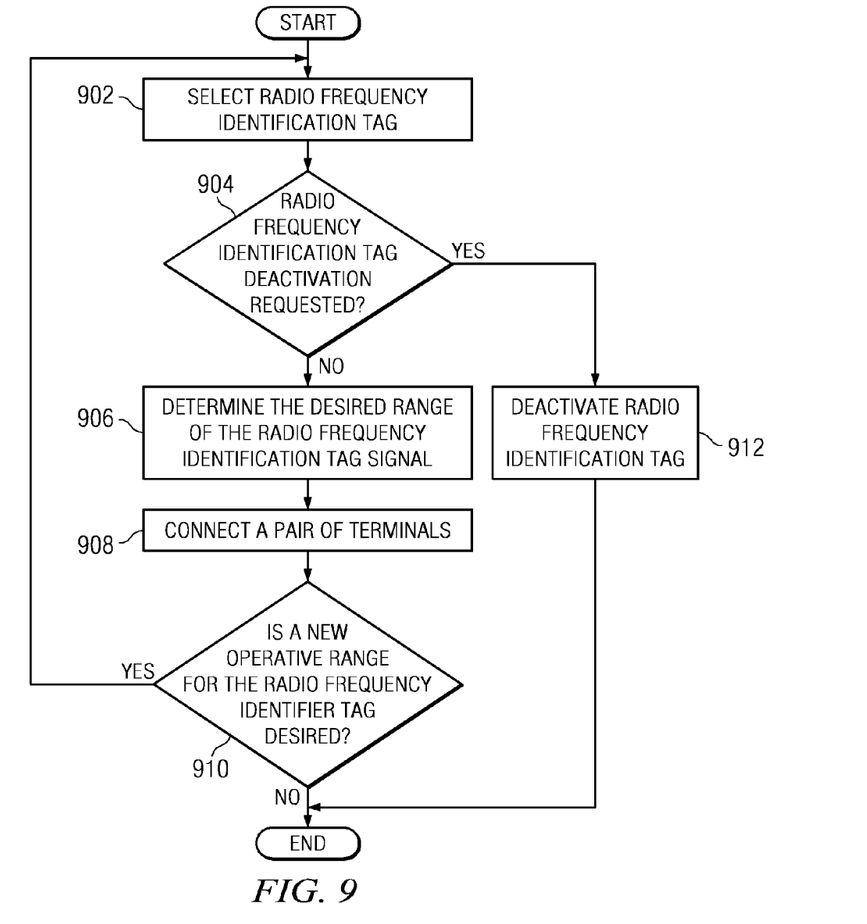
FIG. 9 is a flowchart of a process for controlling a range of a radio frequency identification tag signal by connecting a pair of terminals on a radio frequency identification tag in accordance with an illustrative embodiment.

Referring now to FIG. 9, a flowchart of a process for controlling a range of a radio frequency identification tag signal by connecting a pair of terminals is depicted in accordance with an illustrative embodiment. In the illustrative example shown in FIG. 9, the process is performed by a user of the radio frequency identification tag.

The process begins by selecting a radio frequency identification tag (step 902). The process then makes a determination as to whether radio frequency identification tag deactivation is required (step 904). If the process makes the determination that radio frequency identification tag deactivation is not required (no output to step 904), then the process makes the determination as to the desired range of the radio frequency identification tag signal (step 906). The process then connects a pair of terminals corresponding to a desired range of the radio frequency identification tag signal (step 908). The process then makes the determination as to whether a new range for the radio frequency identification tag signal is desired (step 910). If the process makes the determination that a new range for the radio frequency identification tag signal is required (yes output to step 910), then the process returns to step 902. If no new range is desired (no output to step 910), then the process terminates thereafter.

Returning now to step 904, if the process makes the determination that radio frequency identification tag deactivation is desired (yes output to step 904), the process deactivates the radio frequency identification tag (step 912). The process terminates thereafter.

Figure 10:
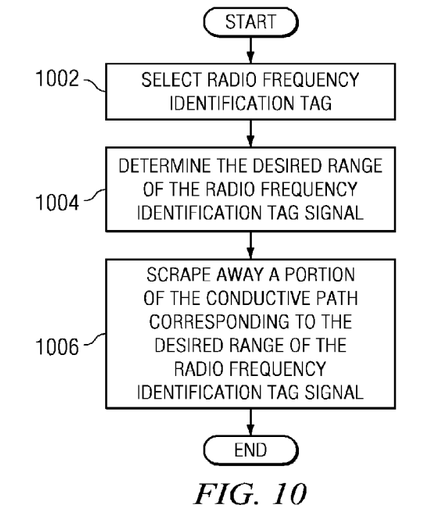
FIG. 10 is a flowchart of a process for controlling a range of a radio frequency identification tag signal by scraping away a portion of a conductive path in a radio frequency identification tag in accordance with an illustrative embodiment.

Referring now to FIG. 10, a flowchart of a process for controlling a range of a radio frequency identification tag signal by scraping away a portion of a conductive path in a radio frequency identification tag is depicted in accordance with an illustrative embodiment. In the illustrative example shown in FIG. 10, the process is performed by a user of the radio frequency identification tag.

The process begins by selecting a radio frequency identification tag (step 1002). The process then determines a desired range of the radio frequency identification tag signal (step 1004). The process then scrapes away a portion of one or more conductive paths corresponding to a desired range of the radio frequency identification tag signal (step 1006).

Figure 11:
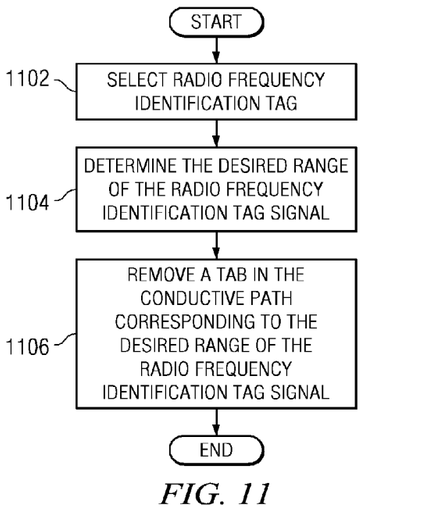
FIG. 11 is a flowchart of a process for controlling a range of a radio frequency identification tag signal by removing a tab in a conductive path in a radio frequency identification tag in accordance with an illustrative embodiment.

Referring now to FIG. 11, a flowchart of a process for controlling a range of a radio frequency identification tag signal by removing a tab in a conductive path in a radio frequency identification tag is depicted in accordance with an illustrative embodiment. In the illustrative example shown in FIG. 11, the process is performed by a user of the radio frequency identification tag having electrical bypasses traversing removable tabs.

The process begins by selecting a radio frequency identification tag (step 1102). The process then determines a desired range of the radio frequency identification tag signal (step 1104). The process then removes one or more tabs in one or more conductive paths corresponding to the desired range of the radio frequency identification tag signal (step 1106). The process terminates thereafter.

Figure 12:
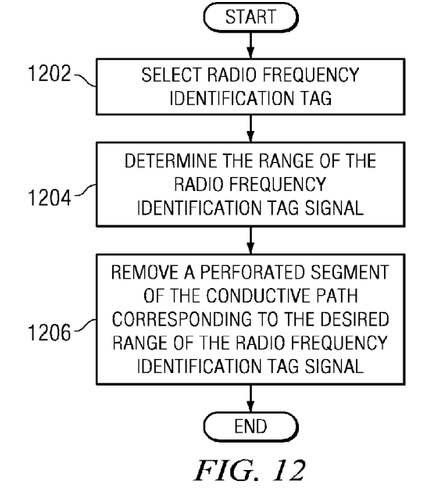
FIG. 12 is a flowchart of a process for controlling a range of a radio frequency identification tag signal by displacing a perforated segment of a conductive path in a radio frequency identification tag in accordance with an illustrative embodiment.

Referring now to FIG. 12, a flowchart of a process for controlling a range of a radio frequency identification tag signal by removing a perforated segment of a conductive path in a radio frequency identification tag is depicted in accordance with an illustrative embodiment. In the illustrative example shown in FIG. 12, the process is performed by a user of a radio frequency identification tag having electrical bypasses traversing perforated segments.

The process begins by selecting a radio frequency identification tag (step 1202). The process then determines a desired range of the radio frequency identification tag signal (step 1204). The process then punches out or otherwise removes one or more perforated segments in one or more conductive paths corresponding to the desired range of the radio frequency identification tag signal (step 1206). The process terminates thereafter.

Figure 13:
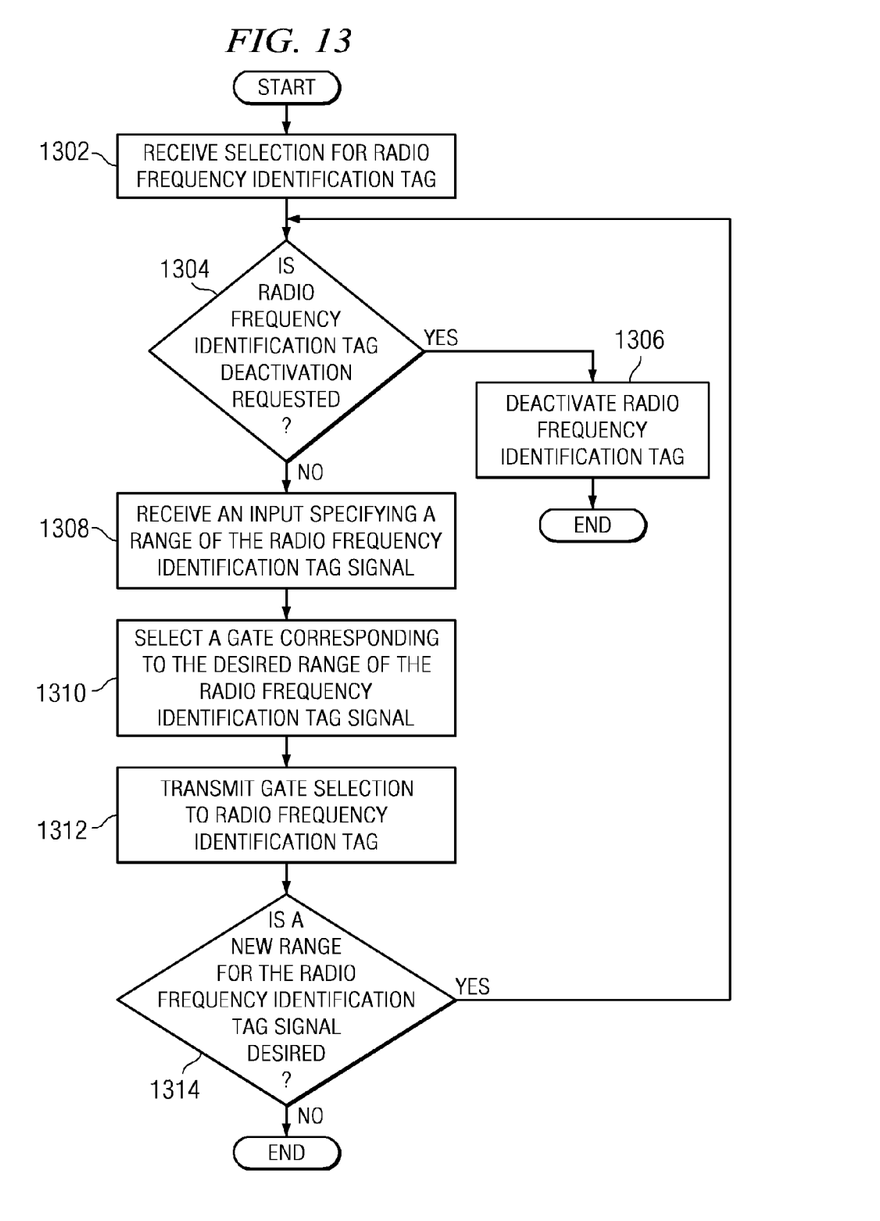
FIG. 13 is a flowchart of a process for controlling a range of a radio frequency identification tag signal by selecting a gate on a radio frequency identification tag in accordance with an illustrative embodiment.

Referring now to FIG. 13, a flowchart of a process for controlling a range of a radio frequency identification tag signal by selecting a gate on a radio frequency identification tag is depicted in accordance with an illustrative embodiment. In the illustrative example shown in FIG. 13, the process is implemented by a software component, such as controller 318 of radio frequency identification tag reader 306 of FIG. 3.

The process begins by receiving a gate selection for a radio frequency identification tag (step 1302). The process then makes the determination as to whether a radio frequency identification tag deactivation is requested (step 1304). If radio frequency identification tag deactivation is requested (yes output to step 1304), then the process deactivates the radio frequency identification tag (step 1306), and the process terminates thereafter.

Returning now to step 1304, if the process makes the determination that radio frequency identification tag deactivation is not requested (no output to step 1304), then the process receives an input specifying a desired range of a radio frequency identification signal (step 1308). The process selects one or more gates corresponding to the desired range (step 1310) and transmits the gate selection to the radio frequency identification tag (step 1312).

The process may then make the determination as to whether a new range of the radio frequency identification tag signal is desired (step 1314). If the process makes the determination that no new range of the radio frequency identification tag signal is desired (no output to step 1314), then the process terminates thereafter. However, if the process makes the determination that a new range of the radio frequency identification signal is desired (yes output to step 1314), then the process returns to step 1304.

Figure 14:
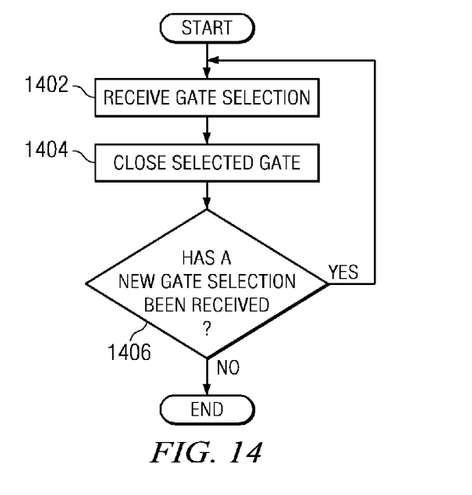
FIG. 14 is a flowchart of a process for controlling a range of a radio frequency identification tag signal in a radio frequency identification tag having a switching device in accordance with an illustrative embodiment.

Referring now to FIG. 14, a flowchart of a process for controlling a range of a radio frequency identification tag signal of a radio frequency identification tag having a switching device is depicted in accordance with an illustrative embodiment. In the illustrative example shown in FIG. 14, the process is implemented by a switching device, such as switching device 816 of FIG. 8.

The process begins by receiving a gate selection from a radio frequency identification tag reader (step 1402). Responsive to receiving the gate selection, the process closes the selected gate or gates, thereby selecting one or more conductive paths corresponding to a desired range of a radio frequency identification tag signal (step 1404).

The process then makes the determination as to whether a new gate selection has been received (step 1406). If a new gate selection has been received (yes output to step 1406), then the process returns to step 1402. If no new gate selection has been received (no output to step 1406), then the process terminates thereafter.

The illustrative embodiments described herein provide a method, an apparatus, and a computer usable program product for controlling a range of a radio frequency identification tag signal. The process identifies an operative range for the radio frequency identification tag signal of a radio identification tag. The process then selects a set of conductive paths in the radio frequency identification tag corresponding to the desired operative range. The set of conductive paths controls the range of the radio frequency identification tag signal in the radio identification frequency tag.

Using this method, apparatus, and computer usable program product, one embodiment of a radio frequency identification tag can be mass produced for use in varying environments and applications. Mass production of the radio frequency identification tag decreases the cost of the radio frequency identification tag, thereby allowing the radio frequency identification tag to be used for applications that would not otherwise be economically feasible. Further, more than one embodiment of this method and apparatus allows a user to easily reset the operative range of a radio frequency identification tag signal without the need for specialized equipment. Other embodiments permit the radio frequency identification tag to be reset or deactivated, if necessary.

For example, a consumer item purchased in a store may have affixed to it a radio frequency identification tag having a long operative range that permits the radio frequency identification tag to communicate to a radio frequency identification tag reader throughout the store. A cashier or other store employee may reset the operative range of the radio frequency identification tag to operate at the shortest operative range after the item is purchased. Thus, a user of a radio frequency identification tag reader is prevented from identifying the item from a car on the street outside the purchaser's home, for example. In addition, the radio frequency identification tag is still capable of being read, albeit at a shorter operative range, at a later date, for a product return or similar transaction.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling a range of a radio frequency identification tag signal, the method comprising:
    identifying a desired operative range for the radio frequency identification tag signal of a radio frequency identification tag, wherein the radio frequency identification tag comprises a set of conductive paths, each path of the set of conductive paths comprises at least one resistor such that each of the set of conductive paths comprises a different one of a set of resistances; and
    selecting a set of conductive paths in the radio frequency identification tag corresponding to the desired operative range, wherein the set of conductive paths controls the range of the radio frequency identification tag signal in the radio frequency identification tag by altering the total resistance of the tag by directing current through the at least one resistor of different ones of set of conductive paths, wherein the step of selecting the conductive path comprises establishing an electrical connection between the first terminal and the second terminal by connecting the first terminal and the second terminal with at least one of a conductive ink marking and a graphite marking.

2. The method of claim 1, wherein the step of selecting the conductive path corresponding to the desired operative range further comprises:
    disrupting an electrical bypass selected from a set of two or more electrical bypasses.

3. The method of claim 2, wherein disrupting the electrical bypass selected from the set of two or more electrical bypasses further comprises:
    removing a portion of a conductive material, wherein the portion of the conductive material comprises the electrical bypass selected from the set of two or more electrical bypasses.

4. The method of claim 2, wherein disrupting the electrical bypass selected from the set of two or more electrical bypasses further comprises:
    removing a perforated segment on which a portion of a conductive material comprising the electrical bypass is located.

5. The method of claim 2, wherein disrupting the electrical bypass selected from the set of two or more electrical bypasses further comprises:
    removing a tab on which a portion of a conductive material comprising the electrical bypass is located.

6. The method of claim 1, wherein the step of selecting the conductive path corresponding to the desired operative range further comprises:
    operating a radio frequency identification tag reader to direct a switch coupled to the radio frequency identification tag to select the conductive path from the set of conductive paths.

7. An apparatus comprising:
    a radio frequency identification tag chip;
    an antenna coupled to the radio frequency identification tag chip; and
    a first resistor coupled to a second resistor selected from a set of two or more resistors, wherein the set of two or more resistors are selectable to specify a radio frequency identification tag signal strength, wherein a set of conductive paths controls the range of the radio frequency identification tag signal in the radio frequency identification tag by altering the total resistance of the tag by directing current through the set of two or more resistors of different ones of the set of conductive paths, wherein the second resistor from the set of two or more resistors is selectable by establishing an electrical connection between a first terminal and a second terminal of the set of conductive paths with one of a conductive ink marking and a graphite marking.

8. The apparatus of claim 7, wherein the first resistor is coupled to the second resistor through a switching device operable to determine a conductive path.

9. The apparatus of claim 7, wherein the radio frequency identification tag is coupled to a battery.

10. The apparatus of claim 7, wherein the second resistor from the set of two or more resistors is selectable by disrupting an electrical bypass circumventing the second resistor.

11. The apparatus of claim 10, wherein a portion of the conductive path of the electrical bypass is located on a perforated segment, wherein the perforated segment is removable to disrupt the electrical bypass.

12. The apparatus of claim 10, wherein a portion of the conductive path of the electrical bypass is located on a tab, and wherein the tab is removable to disrupt the electrical bypass.

13. A system for controlling a range of a radio frequency identification tag signal, the system comprising:
    a computing device having a memory to store information for communicating with a radio frequency identification tag;
    a radio frequency identification tag reader coupled to the computing device, wherein the radio frequency identification tag reader is operable to communicate with the radio frequency identification tag, wherein the radio frequency identification tag comprises a set of conductive paths, each path of the set of conductive paths comprises at least one resistor such that each of the set of conductive paths comprises a different one of a set of resistances; and
    the radio frequency identification tag, wherein the radio frequency identification tag comprises a set of two or more conductive pathways selectable for controlling the range of the radio frequency tag signal, wherein the set of conductive paths controls the range of the radio frequency identification tag signal in the radio frequency identification tag by altering the total resistance of the tag by directing current through the at least one resistor of different ones of set of conductive paths, and, wherein the two or more conductive pathways are selectable by establishing an electrical connection between the first terminal and the second terminal by connecting the first terminal and the second terminal with at least one of a conductive ink marking and a graphite marking.

14. The method of claim 13, wherein disrupting the electrical bypass selected from the set of two or more electrical bypasses further comprises:

removing the portion of the conductive material, wherein the portion of the conductive material comprises the electrical bypass selected from the set of two or more electrical bypasses.

15. The system of claim 13, wherein the portion of the conductive material of the electrical bypass is located on a perforated segment, wherein the perforated segment is removable to disrupt the electrical bypass.

16. The system of claim 13, wherein the portion of the conductive material of the electrical bypass is located on a tab, and wherein the tab is removable to disrupt the electrical bypass.

* * * * *